United States Patent [19]

Seidl et al.

[11] Patent Number: 5,066,760
[45] Date of Patent: Nov. 19, 1991

[54] MIXED POLYIMIDES AND PROCESS FOR PREPARING THEM

[75] Inventors: Sigrid Seidl, Seewalchen; Klaus Weinrotter, Vöcklabruck; Reinhold Simharl, Lenzing, all of Austria

[73] Assignee: Lenzing Aktiengesellschaft, Lenzing, Austria

[21] Appl. No.: 546,517

[22] Filed: Jun. 29, 1990

[30] Foreign Application Priority Data

Jul. 13, 1989 [AT] Austria ................................. 1700/89

[51] Int. Cl.$^5$ ............................................. C08G 18/00
[52] U.S. Cl. ..................................... 528/51; 528/57; 528/67; 528/73; 528/336; 528/338; 528/339; 528/340; 528/348
[58] Field of Search ....................... 528/51, 57, 67, 73, 528/336, 338, 339, 340, 348

[56] References Cited

U.S. PATENT DOCUMENTS

| | | | |
|---|---|---|---|
| 3,666,709 | 5/1972 | Suzuki et al. | 260/33.4 P |
| 3,708,458 | 1/1973 | Alberino et al. | 260/65 |
| 3,985,934 | 10/1976 | Farrissey, Jr. et al. | 428/397 |
| 4,629,777 | 12/1986 | Pfeifer | 528/353 |
| 4,657,832 | 4/1987 | Pfeifer | 430/18 |
| 4,801,502 | 1/1989 | Weinrotter et al. | 428/397 |
| 4,871,500 | 10/1989 | Harms et al. | 264/178 |

FOREIGN PATENT DOCUMENTS

| | | |
|---|---|---|
| 387783 | 3/1989 | Austria . |
| 1230438 | 8/1988 | Canada . |
| 0132221 | 1/1985 | European Pat. Off. . |
| 0242815 | 4/1987 | European Pat. Off. . |
| 0119185 | 1/1989 | European Pat. Off. . |
| 3962588 | 7/1970 | Fed. Rep. of Germany . |

Primary Examiner—Maurice J. Welsh
Attorney, Agent, or Firm—Kenyon & Kenyon

[57] ABSTRACT

To produce mixed polyimides having structural units of the general formulae

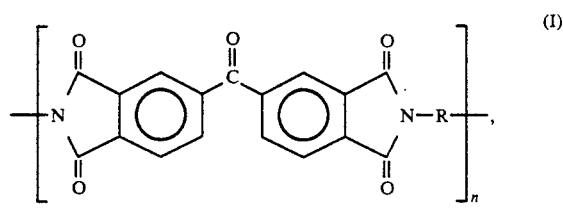

and

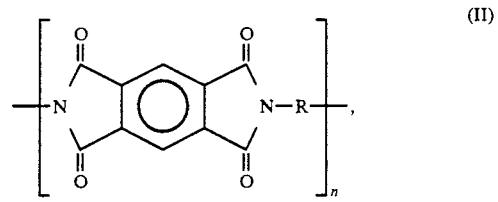

wherein n is an integer larger than 1 and R represents a divalent aromatic residue, a solution of an intramolecular tetracarboxylic acid dianhydride mixture including 50 to 99% by mol benzophenone-3,3',4,4'-tetracraboxylic acid dianhydride and 50 to 1% by mol pyromellitic acid dianhydride is heated in a polar aprotic solvent and is admixed with an altogether equimolar amount of 2,4- and/or 2,6-toluenediisocyanate and/or methylenebis(phenylisocyanate). The mixed polyimides according to the invention are readily soluble in organic solvents, are flame-retardant and exhibit a good thermostability.

9 Claims, No Drawings

MIXED POLYIMIDES AND PROCESS FOR PREPARING THEM

The invention relates to mixed polyimides having structural units of the general formulae

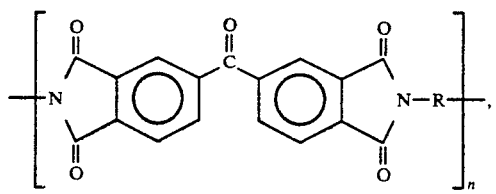

and

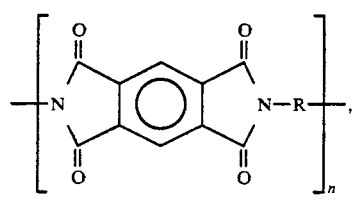

wherein n is an integer larger than 1 and R represents a divalent aromatic residue, as well as to a process for the preparation of the same.

Aromatic polyimides are appreciated materials on account of their extremely high thermal resistance, their chemical resistance and their flame retardancy.

However, the processing of crude polymers mostly is impeded by the fact that they are not meltable and cannot even be dissolved in organic solvents due to the strong forces interacting between their molecular chains.

Attempts have been made to circumvent this problem by condensing the desired polyimide from polycarboxylic acid anhydrides and aromatic amines via a two-step synthesis to polyamide carboxylic acid at first. Such polyamide carboxylic acids are readily soluble in organic solvents and, therefore, can be further processed to films, fibers and other shaped articles in a simple manner. The dehydration of polyamide carboxylic acid to polyimide usually is effected only after this, e.g., by heating.

This approach, still, has the great disadvantage that water is released a second time during hardening of the polyimide, thus affecting the quality of the end product.

A similiar process is known from EP-A2-0 242 815, according to which polyimides having the initially defined structural units are prepared from benzophenone-3,3',4,4'-tetracarboxylic acid dianhydride (BTDA), pyromellitic acid dianhydride (PMDA) and 9,9'-bis(4-aminophenyl)fluorene by initially stirring the reaction mixture for two hours at 40° C. in order to obtain a homogeneous solution, which is then heated to 150° C. and stirred for further two hours. After this, the water forming during imidization is distilled off at a temperature of 190° C., which requires additional two hours.

Although the polyimides formed exhibit a certain solubility in organic solvents, such as dimethylacetamide, N-methylpyrrolidone or methylene dichloride, the expensive and difficulty handleable m-cresol must be employed as the reaction medium. Another disadvantage of this process consists in the long reaction time.

The same disadvantages are faced with the process according to DE-A- 19 62 588, according to which, among others, mixed polyimides are prepared from BTDA, PMDA, 2,4-aminotoluene and 4,4'-diaminodiphenylpropane.

In CA-A-1,240,438 aromatic polyimides are described, which are producible from BTDA or PMDA and aromatic amines in N-methylpyrrolidone as the reaction medium. Yet, even there, a dehydration step must be provided to enable the formation of the polyimide.

Moreover, attempts were made in the past to produce more readily soluble polyimides from polycarboxylic acid dianhydrides and diisocyanates in a one-step process. For instance, U.S. Pat. No. 3,985,934 discloses a process for preparing a mixed polyimide soluble in DMF, from BTDA and a diisocyanate mixture consisting of 70 to 90% by mol toluene diisocyanate (TDI) and 10 to 30% by mol methylenebis(phenyl isocyanate) (MDI).

The advantages of a polyimide that is readily soluble in organic solvents are obvious: in further processing, only the solvent needs to be removed. Additional heating at elevated temperatures for imidization and elimination of the reaction water forming is not necessary.

The polyimide solution obtained can be spun to high-temperature resistant, flame-retardant fibers, e.g., directly by a dry spinning process (EP-A 0 119 185). Moreover, it may be used for producing high-temperature resistant films and coating substances (AT-B-387,783). Upon precipitation of the polyimide, the polyimide powder can be processed further to high-temperature resistant shaped articles by sintering or hot pressing (U.S. Pat. No. 3,708,458). The glass transition temperatures of these polyimides range between 295° and 315° C., their decomposition points being between 520° and 560° C.

Yet, it has proved that with an increasing solubility of the polyimides, their thermostability decreases. This phenomenon is to be observed most clearly with the derivatives of the polyimide produced from PMDA and p-diaminobenzene. The molecular chain of this polyimide consists exclusively of aromatic residues and imide cycles, it is insoluble in organic solvents and exhibits the greatest thermostability among the polyimides. While its solubility is enhanced by the incorporation of so-called "joining atoms" (e.g., —CH$_2$—; —CO—; —SO$_2$—; —O—) in the molecular chain, its thermostability thereby is further reduced.

It is the object of the invention to provide mixed polyimides having structural units of the initially defined kind, which are readily soluble in polar organic solvents and, nevertheless, exhibit a high thermostability.

The mixed polyimides according to the invention comprise structural units of the general formulae

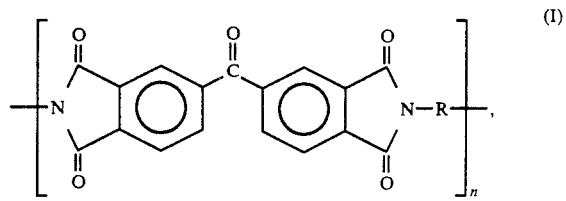

and

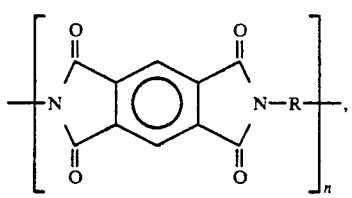 (II)

wherein n is an integer larger than 1 and R is a divalent aromatic residue, and are characterized in that R represents one or several group(s) selected from

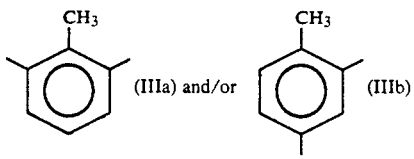

and

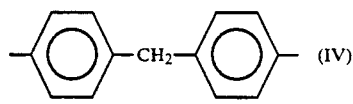 (IV)

and that the glass transition temperature lies above 325° C., with the proviso that R represents the group(s) (IIIa) and/or (IV) if it also stands for the group (IIIb).

The enhanced high-temperature stability of the polyimides according to the invention is reflected by the fact that, in particular, they have a glass transition temperature ranging between 330° C. and 370° C. and also are flame-retardant. Thus, LOI values ("limited oxygen index" determined according to ASTMD 2863) of between 41 and 46% $O_2$ were measured with films, for instance.

It has proved that there is a clear correlation between the composition of the structural units (I) and (II) and the thermal properties in the polyimides according to the invention. This correlation is particularly pronounced if the molar ratio of the structural units of the general formula (I) to the structural units of the general formula (II) ranges between 1:1 and 99:1.

In this range, there exists, for instance, an almost linear interdependence between the glass transition temperature of the mixed polyimide and its portion of the imide structural unit (II). The higher this portion, the higher its glass transition temperature, an increase by 10% by mol (based on the total content of structural units (I) and (II)) causing an increase in the glass transition temperature almost exactly by 10° C. (cf. Table).

This correlation can be observed both with mixed polyimides in which the residue R exclusively represents the group(s) (IIIa) or (IIIa) and (IIIb) and with those in which R additionally stands for the group (IV), the molar ratio of the group(s)

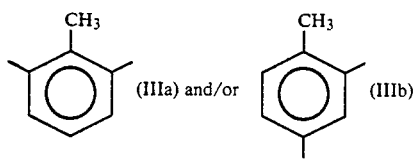

to the group

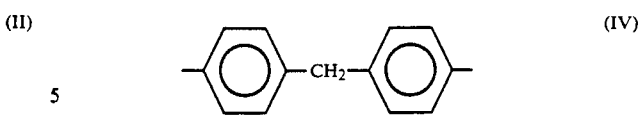 (IV)

preferably being at least 7:3.

A preferred embodiment of the mixed polyimides according to the invention contains both the residue (IIIa) and the residue (IIIb) in the polyimide chain, the residue (IIIb) making up for 70% to 90% of the total toluene residues (IIIa) and (IIIb).

As is further apparent from the Table, mixed polyimides in whose molecular chains both groups (III) and (IV) are incorporated have a lower glass transition temperature than those comprising group(s) (III) only. Thus, the polyimides according to the invention offer the possibility of a selective thermostability control by choosing the portions of structural units (II) and of group (IV).

The invention also relates to a process for the preparation of the mixed polyimides according to the invention, which is characterized by the combination of the following measures:

heating a solution of an intramolecular tetracarboxylic acid dianhydride mixture consisting of 50 to 99% by mol benzophenone-3,3',4,4'-tetracarboxylic acid dianhydride and 50 to 1% by mol pyromellitic dianhydride in a polar aprotic solvent, and admixing this solution with an altogether equimolar amount of 2,4- and/or 2,6-toluenediisocyanate and/or methylenebis(phenylisocyanate), wherein heating most suitably is effected in a dipolar solvent at a temperature of between 60° C. and 150° C., preferably of between 70° C. and 100° C.

Dimethylformamide, dimethylacetamide, N-methylpyrrolidone and dimethylsulfoxide are suitable solvents in the first place, the amount of solvent having to be at least that large that initially all the reaction partners are present in the dissolved form. The upper limit of the amount of solvent used, preferably, is chosen such that the finished polymer solution will have a polyimide content of 15 to 40 percent by weight.

The preparation of the mixed polyimide according to the invention may be catalyzed by the addition of an alkali metal hydroxide, alcoholate, carbonate or of phospholene, phospholane or phosphetane derivatives in an amount ranging between 0.0001 and 0.1 mol per mol of diisocyanate. Part of these substances have already been known as polymerization accelerators in other condensation reactions.

When carrying out the reaction, the respective amount of diisocyanate is dropwisely added as quickly as possible to the solution of the dianhydrides and the catalyst at a reaction temperature of 60° to 150° C., preferably 70° to 100° C. The progression of the reaction may be followed, for instance, by IR spectral analysis (absence of absorption corresponding to free NCO groups). During the reaction, $CO_2$ is released. After the addition of the equimolar amount of diisocyanate, the end of the $CO_2$ development indicates the end of the reaction. No free NCO or anhydride groups are to be detectable by IR spectral analysis in the finished copolyimide solution.

After the reaction is finished, viscous copolyimide solutions having an inherent viscosity (c=0.5 g/dl at 25° C. in DMF/1% LiBr) of from 30 to 80 ml/g are obtained. In order to be able to characterize the copolyimides obtained, the respective copolyimide is precipitated from the solution by the addition of a precipitant, such as acetone or isopropanol.

The mixed polyimides according to the invention also may be produced by using 2,4- and/or 2,6-toluenediamine and methylenbis(phenylamine), respectively, instead of toluenediisocyanate and the optional methylenebis(phenylisocyanate).

In this case, the diamine is dropwisely added to a solution of the dianhydrides in an aprotic polar solvent at temperatures ranging from room temperature to 175° C. The polyamic acid obtained subsequently is imidized by heating the reaction mixture to temperatures of between 170° and 220° C. and removal of the water formed. However, imidization may be effected also chemically by the addition of, e.g., acetic anhydride in the presence of a tertiary amine.

The following examples serve to illustrate the invention in more detail.

EXAMPLE 1

145 g (0.45 mol) benzophenone-3,3',4,4'-tetracarboxylic acid dianhydride and 10.91 g (0.05 mol) pyromellitic dianhydride and 0.2 g (0.0037 mol) sodium methylate were dissolved in 597 g dry DMF in a 1000 ml flask fitted with a stirrer, a reflux cooler, a thermometer and nitrogen flushing. The reaction mixture was heated to 80° C., and 87.08 g (0.5 mol) toluenediisocyanate consisting of 2,4-isomers by 80% and of 2,6-isomers by 20% were dropwisely added within four hours under constant stirring and nitrogen atmosphere. After this, the finished polycondensation solution was continued to be stirred for one hour at 80° C. until the end of the $CO_2$ development.

The finished polycondensation solution had an inherent viscosity (c=0.5 g/dl at 25° C. in DMF/1% LiBr) of 32 ml/g. By the addition of acetone, the polyimide was precipitated, the precipitate was filtered, washed and dried. The glass transition temperature of the powder was 340° C.

EXAMPLES 2 TO 8

Seven other copolyimides were produced following the procedure described in Example 1. The composition of each reaction mixture and the characterization of the respective copolyimides are apparent from the Table.

The TDI employed in Examples 3 to 8 consisted of 2,4-isomers by 80% and of 2,6-isomers by 20%. The TDI used in Example 2 had a composition of 70% 2,4-isomers and 30% 2,6-isomers.

| Example No. | Composition Dianhydride g (mol) | Diisocyanate g (mol) | NaOMe g (mol) | DMF g | Inh. visc.[1] (ml/g) | $T_g$[2] (°C.) |
|---|---|---|---|---|---|---|
| 2 | BTDA 128.9 (0.4) PMDA 21.8 (0.1) | TDI 87.1 (0.5) | 0.2 (0.0037) | 581 | 34 | 350 |
| 3 | BTDA 112.8 (0.35) PMDA 32.7 (0.15) | TDI 87.1 (0.5) | 0.2 (0.0037) | 566 | 39 | 360 |
| 4 | BTDA 96.7 (0.3) PMDA 43.6 (0.2) | TDI 87.1 (0.5) | 0.2 (0.0037) | 581 | 43 | 368 |
| 5 | BTDA 145 (0.45) PMDA 10.9 (0.05) | TDI 69.6 (0.4) MDI 25 (0.1) | 0.2 (0.0037) | 620 | 40 | 330 |
| 6 | BTDA 128.9 (0.4) PMDA 21.8 (0.1) | TDI 69.6 (0.4) MDI 25 (0.1) | 0.2 (0.0037) | 604 | 46 | 339 |
| 7 | BTDA 112.8 (0.35) PMDA 32.7 (0.15) | TDI 69.6 (0.4) MDI 25 (0.1) | 0.2 (0.0037) | 550 | 50 | 350 |
| 8 | BTDA 96.7 (0.3) PMDA 43.6 (0.2) | TDI 69.6 (0.4) MDI 25 (0.1) | 0.2 (0.0037) | 572 | 57 | 358 |

BTDA Benzophenone-3,3',4,4'-tetracarboxylic acid dianhydride
PMDA pyromellitic acid dianhydride
TDI toluene diisocyanate (2,4 and/or 2,6 isomer)
MDI methylenebis(phenylisocyanate)
NaOMe sodium methylate
DMF dimethylformamide
[1] inherent viscosity, c = 0.5 g/dl at 25° C. in DMF/1% LiBr
[2] $T_g$ = glass transition temperature determined by means of differential scanning calorimeter, heating rate 20° C./min in $N_2$

What we claim is:

1. In mixed polyimides having structural units of the general formulae

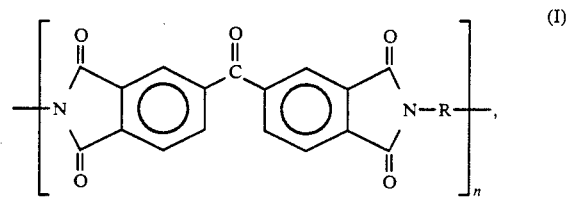

and

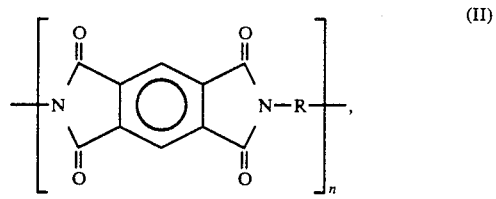

wherein n is an integer larger than 1 and R represents a divalent aromatic residue, the improvement wherein R represents at least one of the groups selected from

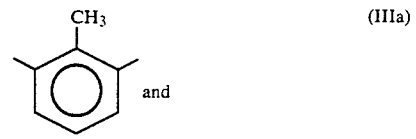

and

-continued

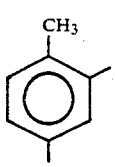

and

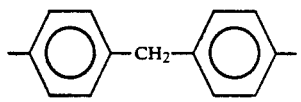

(IIIb)

(IV)

and wherein the glass transition temperature lies above 325° C., with the proviso that R represents at least one of the groups (IIIa) and (IV) if it also stands for the group (IIIb).

2. Mixed polyimides as set forth in claim 1, wherein the molar ratio of the structural units of general formula (I) to the structural units of general formula (II) ranges between 1:1 and 99:1.

3. Mixed polyimides as set forth in claim 1, wherein the molar ratio of at least one of the groups

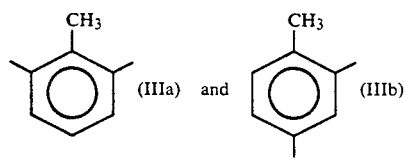

to the group

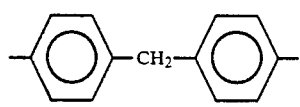

amounts to at least 7:3.

4. A process for preparing mixed polyimides having structural units of the general formulae

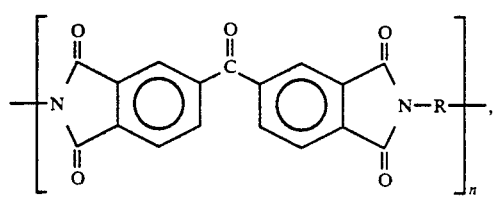

and

-continued

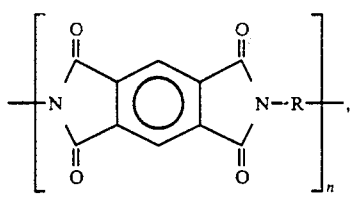

(II)

wherein n is an integer larger than 1 and R represents a divalent aromatic residue comprised of at least one of the groups selected from

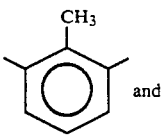

(IIIa)

and

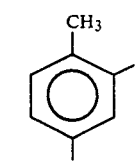

(IIIb)

and

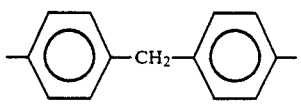

(IV)

and wherein the glass transition temperature lies above 325° C., with the proviso that R represents at least one of the groups (IIIa) and (IV) if it also stands for the group (IIIb), which process comprises the steps of heating a solution of an intramolecular tetracarboxylic acid dianhydride mixture comprising 50 to 99% by mol benzophenone-3,3',4,4'-tetracraboxylic acid dianhydride and 50 to 1% by mol pyromellitic acid dianhydride in a polar aprotic solvent, and admixing said solution with an altogether equimolar amount of at least one of 2,4- and 2,6-toluenediisocyanate and methylenebis(phenylisocyanate).

5. A process as set forth in claim 4, wherein said heating is effected in a dipolar solvent and at temperatures ranging between 60° C. and 150° C.

6. A process as set forth in claim 5, wherein said heating is effected at temperatures ranging between 70° C. and 100° C.

7. A process as set forth in claim 4, further comprising adding to said solution a polymerization accelerator selected from the group consisting of alkali metal hydroxide, alkali metal alcoholate, alkali metal carbonate, and phospholene, phospholane and phosphetane derivatives, in an amount ranging between 0.0001 and 0.1 mol per mol of diisocyanate.

8. A process as set forth in claim 4, wherein at least one of 2,4-toluenediamine and 2,6-toluenediamine is used instead of toluene diisocyanate.

9. A process as set forth in claim 4, wherein methylenbis(phenylamine) is used instead of methylenbis(phenylisocanate).

* * * * *